United States Patent Office 3,589,865
Patented June 29, 1971

3,589,865
SYNTHESIS OF AMMONIA
Eugene E. van Tamelen, Los Altos Hills, Calif., assignor to The Board of Trustees of the Leland Stanford Junior University, Stanford, Calif.
No Drawing. Filed July 30, 1968, Ser. No. 748,637
Int. Cl. C01c 1/00
U.S. Cl. 23—193                          10 Claims

ABSTRACT OF THE DISCLOSURE

Molecular nitrogen is converted to ammonia at room temperature and atmospheric pressure by a process of contacting nitrogen or air with a $Ti^{IV}$ or $Ti^{III}$ compound during its reduction to a $Ti^{II}$ compound in a suitable solvent, followed by addition of a protonating agent. The process may be used for purposes other than the production of ammonia, such as scavenging gases or sensing the presence of nitrogen or oxygen.

---

The invention described herein was made in the course of work under a grant or award from the Department of Health, Education and Welfare.

DESCRIPTION

This invention relates to the reduction of nitrogen and oxygen and more particularly to the production of ammonia from molecular nitrogen.

At present the process most commonly used, if not exclusively used, to synthesize ammonia commercially from molecular nitrogen is the Haber process, which requires a high pressure and a high temperature. In nature, legumes bring about the fixation of atmospheric nitrogen. Recently processes have been discovered for fixing nitrogen through the medium of $\mu$-ammino-metal species at high pressure.

All such artificial processes require high pressure and/or are too costly for various reasons.

It is an object of the present invention to provide processes of converting molecular nitrogen to ammonia at relatively low temperatures, for example, at room temperature, and at relatively low pressure, e.g., atmospheric pressure.

It is a further object of the invention to provide a low-temperature, low-pressure process for the fixation of nitrogen which has, or which provides the possibility of having, a cyclic and/or recovery feature to economize in the use of reagents and catalysts.

Yet another object of the invention is to provide a system which will react under mild conditions (low temperature and pressure) with nitrogen and/or oxygen and which will serve as a scavenger to rid gases of small amounts, e.g., traces of oxygen and/or nitrogen.

Yet another object of the invention is to provide a reactive system which will react with nitrogen and/or oxygen in an exotic environment, as on a planet, to sense and determine qualitatively and/or quantitatively the presence of such elements.

The above and other objects of the invention will be apparent from the ensuing description and the appended claims.

In accordance with one embodiment of the present invention Ti (IV) or Ti (III) is reduced, preferably at atmospheric pressure and at room temperature, in a suitable solvent, and nitrogen gas or air is bubbled through or otherwise brought into contact with the system.

In accordance with another embodiment of the invention, a solution of a suitable Ti (IV) or Ti (III) compound in a suitable solvent containing also a suitable electrolyte is subjected to electrolysis and nitrogen gas is bubbled through or otherwise brought into reactive contact with the solution during electrolysis.

Instead of nitrogen, oxygen or air may be the reactant.

The following specific examples will serve further to illustrate the practice and advantages of the invention.

EXAMPLE 1

$TiCl_4$ (0.5 mole) was added to a suspension of potassium t-butoxide (1.0 mole) in diglyme at 0° C. under an atmosphere of nitrogen. The resulting suspension of dibutoxy titanium dichloride was allowed to warm to room temperature. Potassium (1.0 mole) was added. Reduction of Ti (IV) was evident from change in color from off-white to intense black and by the disappearance of the potassium metal within 12–24 hours. Meanwhile purified nitrogen gas was bubbled through the reaction mixture and into an acid trap (dilute aqueous boric or sulfuric acid). Within 48 hours after adding the potassium ammonia was detected in the traps. When volatile ammonia ceased to evolve, further potassium was added and production of ammonia resumed.

It was also noted that when reduction of Ti (IV) was carried out stepwise [i.e., Ti(IV)→Ti(III)→Ti(II)] ammonia was generated only after the second equivalent of potassium had been added, thus indicating that it is Ti(II) that effects the transfer of hydrogen to nitrogen and the production of ammonia. Yields of 10–15% ammonia based on titanium were obtained.

Other alkoxides were also used effectively in place of potassium t-butoxide; e.g., potassium methoxide and phenoxide and the potassium salt of 1-hexanol. Also sodium ethoxide coupled with potassium reduction and potassium t-butoxide coupled with sodium reduction have been successfully used. Also dicyclopentadienyltitanium dichloride has been used successfully in place of the titanium compound of Example 1, in conjunction with tetrahydrofuran (THF) or digylene as solvent and sodium naphthalide.

EXAMPLE 2

1.879 grams (82 mmoles) of sodium and 12 grams (an excess) of naphthalene were added to 55 ml. tetrahydrofuran (THF). To this was added dropwise with strong stirring and in an atmosphere of nitrogen, a solution of 2.975 g. (10.0 mmoles) of titanium tetra-isopropoxide (TTIP) in THF. Stirring was continued for one hour. The system was then hydrolyzed in a Kjeldahl apparatus. Titration of trapped ammonia showed 11.03 mmoles of ammonia, or a yield of 110% based on $NH_3/Ti$ molar ratio.

The first step in this process (adding sodium to naphthalene in THF) produced the reducing agent (sodium naphthalide).

EXAMPLE 3

The procedure of Example 2 was modified to provide a cyclic process in which the yield of ammonia (based on Ti) was greatly increased. Table I below illustrates this cyclic process.

TABLE I

| Step | Na (g.) | Na (mmoles) | Isopropyl alcohol (ml.) | HOiPr (mmoles) | NH₃ (mmoles) | NH₃, percent | Naphthalene (g.) |
|---|---|---|---|---|---|---|---|
| 1 | 1.458 | 63.0 | 4.8 | 63.0 | 5.82 | 74.5 | 12 |
| 2 | 1.487 | 64.5 | 4.9 | 64.0 | 5.94 | 76.0 | 9 |
| 3 | 1.660 | 72.0 | 5.4 | 70.0 | 10.01 | 128.5 | 10 |
| 4 | 1.634 | 71.0 | 5.5 | 71.5 | 3.65 | 47.0 | 10 |
| 5 | 2.571 | 112.0 | 8.5 | 111.5 | 1.26 | 16.0 | 16 |

In step No. 1, 2.3 ml. (7.8 mmoles) of TTIP were added dropwise to 60 ml. of a solution of the sodium naphthalide in THF, under strong stirring and under nitrogen at atmospheric pressure. After about 30 minutes ammonia was liberated by addition of isopropyl alcohol (i.e., by alcoholysis) in the amount indicated in the 4th column of the table. The ammonia was trapped by passing a nitrogen stream over the reaction pot and through an acid trap which was subsequently titrated. The remaining solution was then passed to the next step. E.g., in Step 2 this solution was added dropwise to sodium naphthalide solution in 60 ml. THF, the Na and naphthalene being used in the amounts stated in the table. This procedure was repeated at each step. Yields at each step are set forth in the 7th column of the table. In the first two steps insufficient time was allowed to trap ammonia, hence the apparently lower yields. In the last two steps it is believed that the low yields were due to contact of the system with oxygen. Overall yield was 342% based on the molar ratio, $NH_3/Ti$.

EXAMPLE 4

In this instance air was used in place of nitrogen. 4.31 grams (0.181 mole) of sodium and 24.0 g. (0.181 mole) of naphthalene were added to 230 ml. of THF and stirred four hours under nitrogen. Then 4.97 g. (0.0175 mole) of TTIP in 20 ml. THF were added under vigorous stirring. The system was then connected with air through a calcium chloride drying tube. The reaction was stopped when the solution changed color from dark to light brown. After hydrolysis a 44% yield ($NH_3/Ti$) of ammonia was obtained. A similar experiment with nitrogen instead of air gave a 71% yield of ammonia.

EXAMPLE 5

In this instance, an electrolytic procedure was used, as follows:

The electrolysis medium was a solution of TTIP and aluminum chloride (molar ratio 1:1.5) in 1,2-dimethoxyethane. During electrolysis nitrogen gas was bubbled through the electrolysis cell. In most cases this was a single compartment cell equipped with platinum electrodes. In a typical case a solution of 10 mmole TTIP and 15 mmole of aluminum chloride in 20 ml. of dry solvent was subjected for two days to a 90 volt electrolysis, initially at 50 ma. From time to time, the polarity was reversed to eliminate polarization which caused a drop in current. After hydrolysis of the reaction product, ammonia was detected qualitatively by the Berthelot test and was determined quantitatively by titration (about 10% yield, based on $NH_3$:Ti molar ratio). When the titanate ester was omitted, no ammonia was formed. This observation was in keeping with the belief that the aluminum chloride functions mainly as an electrolyte. Thus a solution of aluminum chloride can be electrolyzed for several days without amperage decrease but the current dropped rapidly and reached zero in about two days when the titanate ester-aluminum chloride combination was used.

The titanium is reduced in this electrolytic procedure beyond the III state before appreciable amounts of nitrogen are reduced, as shown by a rough calculation of the amount of current having passed through the cell at the point where ammonia could first be detected. Also, in an experiment conducted in a divided cell, the solution in the cathode compartment rapidly turned blue during the electrolysis, suggesting the presence of Ti-III in the solution. When approximately one molar equivalent of electrons/mole titanium had been passed through the cell, the solution started to turn black, indicating further reduction of titanium, and thereupon ammonia began to appear in bound form. When titanium trichloride was used in place of titanium tetraisopropoxide, ammonia was detected after hydrolysis at a point in time when considerably less (e.g., 10%) electrons per mole of titanium had passed through the solution.

It will be apparent that certain substitutions and variances can be made in the practice of the invention. For example, instead of titanium other transition metals may be used; for example, vanadium, cobalt, ruthenium, osmium, iron, molybdenum, nickel, iridium and chromium.

The agent for reducing Ti (IV) or Ti (III) to Ti (II) may be any of the alkali metals including lithium, or a suitable derivative thereof such as an alkali metal naphthalide (Examples 2, 3 and 4). Instead of a naphthalide, other alkali metal organo-metallic compounds may be used, e.g., sodium and potassium alkyls ($NaC_2H_5$, $KC_4H_9$, etc.), aryls (Na and K phenyls), etc.

The entity associated with the transition metal (butoxy radical and Cl in Example 1, isopropoxide radical in Examples 2, 3 and 4) may be replaced by alkoxy (ethoxy, n-propoxy, etc.), aryloxy (phenoxy, etc,), etc. Also ligands of different types may be employed, e.g., acyloxy (e.g., acetoxy), mercapto ($CH_3S-$, $C_6H_9S-$, etc.). Also metallocenes such as titanocene, ferrocene, etc. may be used as the transition metal entity. Transition metal halides, e.g. $TiCl_4$ may be used but are not preferred.

A wide variety of solvents is permissible. Generally speaking, ether type solvents such as dimethyl, diethyl and other dialkyl ethers, dimethoxy ethane, diglyme and tetrahydrofuran are employed. Also chlorinated solvents, such as carbon tetrachloride, chloroform and the fluorinated lower hydrocarbons; also tertiary amines such as trimethyl and triethyl amines may be used.

In the electrolytic process (Example 5) other inert electrodes than platinum may be used. In place of isopropyl alcohol for working up the product of reaction, compounds generally of formula RH may be used wherein R may be alkyl, alkoxy, aryloxy, etc. Also acids such as HCl and HBr. In the formula RH, H is a hydrogen which is sufficiently reactive for the purpose.

In the electrolytic process (Example 5), other electrolytes than $AlCl_3$ may be used, e.g., other Lewis acids such as $ZnCl_2$. In general, any electrolyte may be used which is soluble in an aprotic solvent and is a conducting salt therein.

The processes of the invention are useful for purposes other than the commercial synthesis of ammonia. For example, molecular nitrogen may be converted directly into products other than ammonia, for example into amino acids, allyl amines, amides, etc. Also, the system may be used for scavenging of inert gases to free them from oxygen and/or nitrogen. The system is highly reactive with both oxygen and nitrogen. For example, if it is desired to obtain ultra-pure helium, neon, xenon, krypton, or the like, these may be purified by existing methods to a certain point, e.g., until there remains only a trace of nitrogen and/or oxygen. The gas is then bubbled through the system of the present invention. Either the chemical systems of Examples 1 to 4 or the electrolytic system of Example 5 may be employed. This procedure results in a considerable saving of cost in ultra-purification of such gases.

Yet another application of the processes of the invention is in connection with the analysis of an exotic atmosphere, e.g., the atmosphere of a planet. Thus, if it is desired to analyze the atmosphere of a planet for nitrogen and/or oxygen, a system such as that of Examples 1, 2, 3 or 4 or of Example 5 is set up and is actuated when the space capsule containing the system lands on the planet or is placed in orbit around the planet within its atmosphere. By an appropriate signal from earth, the atmosphere of the planet will be admitted to the system, for example, by the opening of a valve. If necessary, a motor can be actuated by a suitable signal to bring about agitation or the operation of a pump. If nitrogen is the element investigated, it will be converted to ammonia and a qualitative and quantitative determination of the ammonia can be made. Thus, upon an apropriate signal, or after a predetermined lapse of time, the ammonia can be subjected to a reaction which produces a characteristic color, the presence of which indicates qualitatively the presence of ammonia and the intensity of which indicates quantitatively the amount of ammonia. By well known methods, such as colorimetry, or fluorometry, the presence and the amount of ammonia can be determined, and the result transmitted back to the station on earth. In the case of oxygen, similar techniques can be employed, water being the product of reaction. Thus, the system can be made anhydrous and water produced by reaction of the system with oxygen of the atmosphere can be sensed and measured directly or through a reaction product, e.g., a hydration product.

Yet another application of the system of the invention is as a sensing element to determine and measure the presence of air, oxygen, or nitrogen in a terrestrial system. For example, it can be used to sense leakage of air into a system where it is unwanted or dangerous.

In most such systems, which are remote, the chemical processes of Examples 1-4 are preferred, but for scavenging purposes the electrolytic system is preferred.

In general, it may be stated that the systems of the present invention, whether chemical (Examples 1-4) or electrolytic (Example 5) are capable of serving as sensing, monitoring and measuring systems for air, nitrogen and oxygen.

It will, therefore, be apparent that a new and useful nitrogen and oxygen reduction system has been provided.

I claim:
1. A method of reducing molecular nitrogen to ammonia under mild conditions of temperature and pressure which comprises the following steps:
   (a) providing a solution of a Ti (IV) or Ti (III) compound in organic solvent selected from the group consisting of ether-type solvents, halogenated hydrocarbon solvents and tertiary amine solvents;
   (b) reducing the titanium to Ti (II);
   (c) contacting the solution with molecular nitrogen during the reduction step (b) under mild conditions of temperature and pressure, thereby forming a complex that can be worked up to release ammonia; and
   (d) then adding a protonating agent capable of releasing ammonia from the complex.
2. The process of claim 1 wherein the reduction in step (b) is carried out by means of a chemical reducing agent.
3. The process of claim 2 wherein the chemical reducing agent is an alkali metal.
4. The process of claim 3 wherein the alkali metal is potassium.
5. The process of claim 3 wherein the alkali metal is sodium.
6. The process of claim 2 wherein the reducing agent is the anion of a hydrocarbon.
7. The process of claim 6 wherein the hydrocarbon is naphthalene.
8. The process of claim 1 wherein the reduction in step (b) is carried out by electrolytic means.
9. The process of claim 2 wherein the protonating agent is an alcohol.
10. The process of claim 8 wherein the protonating agent is an alcohol.

References Cited

Vol'pin et al.: "Nature," 209 (1966), p. 1236.

EARL C. THOMAS, Primary Examiner

H. S. MILLER, Assistant Examiner